Patented May 2, 1950

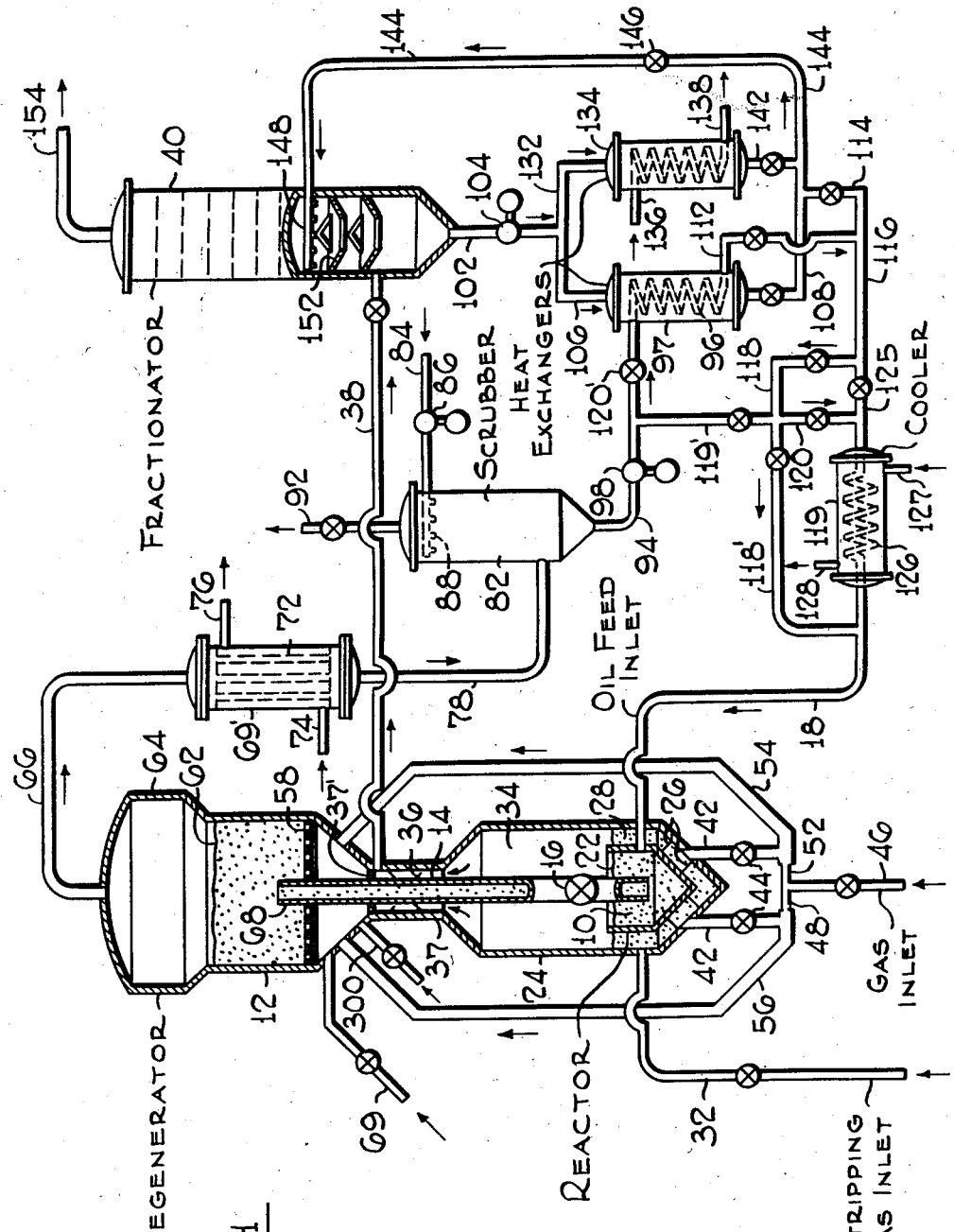

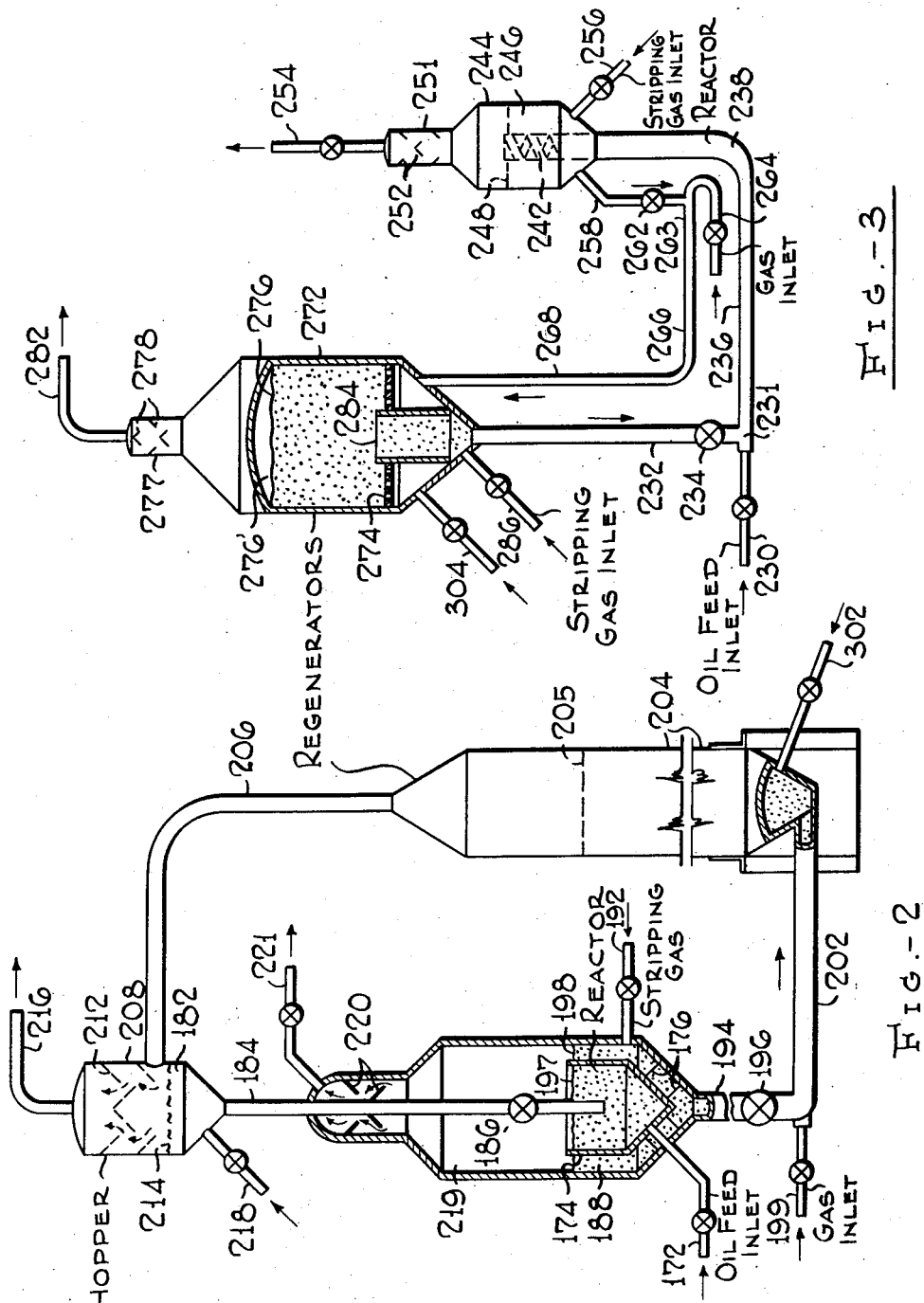

2,506,307

UNITED STATES PATENT OFFICE 2,506,307

CONTACTING GASEOUS FLUIDS AND SOLID PARTICLES

Homer Z. Martin, Roselle, N. J., assignor to Standard Oil Development Company, a corporation of Delaware Original application December 30, 1941, Serial No. 424,872. Divided and this application March 16, 1946, Serial No. 654,846

5 Claims. (Cl. 196—52)

This invention relates to catalytic reactions and more particularly relates to catalytic reactions involving the production of hydrocarbons of relatively low boiling point suitable for use as motor fuels.

According to this invention catalyst in finely divided form is mixed with solid inert particles in finely divided form so that a mixture of solid particles is obtained which when regenerated after a catalytic reaction will supply sufficient heat to the liquid feed to vaporize it and maintain it at reaction temperature in a reaction zone.

For example, in the catalytic cracking of hydrocarbons, carbonaceous material is deposited on the solid particles during cracking and when the solid particles are regenerated as by burning to remove the carbonaceous material, the solid particles are heated to a temperature above the cracking temperature and when these heated solid particles are mixed with the oil feed the oil feed is vaporized and heated to a cracking temperature. Using this invention, a heating or superheating furnace such as a coil heater for vaporizing the oil feed is eliminated. Also regeneration coolers for controlling the temperature in the regeneration zone during regeneration are eliminated and the hot regenerated solid particles are used without any intermediate cooling for mixture with the oil feed.

Several forms of the invention are shown in the drawings and will be more specifically described in the description hereinafter.

In the drawings:

Figure 1 represents one form of apparatus adapted for carrying out the invention in which the regenerator is above the reactor and solid particles are withdrawn in a dense phase from the bottom portion of both the regenerator and the reactor;

Figure 2 represents another form of apparatus adapted for carrying out the invention in which the regenerator is supported near the ground and is of the upflow type, whereas the catalyst in a dense phase is removed from the bottom portion of the reactor; and Figure 3 represents another form of apparatus adapted for carrying out the invention in which the regenerator is in an elevated position and of the bottom draw-off type whereas the reactor is at a lower level and of the upflow type.

Referring now to the drawing and to Figure 1, the reference character 10 designates a reaction zone and the reference character 12 designates a regenerator. Solid particles including inert and catalytic particles are withdrawn from the regenerator 12 by means of a standpipe 14 having a suitable control valve 16 for controlling the amount of solid particles directly introduced into the reaction zone 10. The solid particles undergoing regeneration in the regenerator 12 are maintained in a fluidized condition and flow therefrom through the standpipe 14 like a liquid. As will be later pointed out in greater detail, the solid inert particles act as heat carriers and are used because catalyst only in such large amounts would render the reaction uncontrollable in certain reactions as in catalytic cracking of hydrocarbon oils.

Liquid oil feed, preferably preheated, is introduced into the bottom portion of the reaction zone 10 through line 18. The solid particles including the inert and catalyst particles are maintained in a fluidized condition in the reaction zone 10 and in this way the solid particles are maintained in a turbulent condition and the temperature in the reaction zone is substantially uniform. The level of the fluidized mass in the reaction zone 10 is shown at 22. The level 22 is not quiescent but is more like the surface of a violently boiling liquid. The lower end of standpipe 14 extends below the level 22 of the fluidized mass in reaction zone 10.

As shown in the drawing, the reaction zone comprises a relatively shallow cup-shaped receptacle which is concentric with and arranged in the lower part of a larger vessel 24. The shallow receptacle is suitably supported on the bottom of the larger vessel 24 by means diagrammatically shown at 26. As the reaction zone 10 is of a smaller diameter than the larger vessel 24, an annular space 28 is provided between the reaction zone 10 and the larger vessel 24 into which the solid particles overflow from the reaction zone 10. Suitable stripping gas is introduced into the solid particles in the annular space 28 by means of line 32 to remove volatile hydrocarbons from the solid particles.

The velocity of the vapors passing through the solid particles in the reaction zone 10 is selected to maintain a fluidized mass therein. As more oil and more solid particles are fed into the reaction zone 10, the reaction products in vapor form pass upwardly into the enlarged space 34 in the larger vessel 24 and this enlarged space forms a settling chamber for removing solid particles from the reaction products. In addition, the fluidized solid particles in relatively dense condition overflow the upper rim of the reaction zone 10 and flow into the annular space 28 where additional quantities of vaporous reaction products are released. The solid particles in the annular space are also maintained in fluidized condition but their density is greater than the density of the fluidized mixture in the reaction zone 10.

The reaction products in vapor form pass upwardly from the enlarged chamber 34 and preferably pass through additional separating means shown diagrammatically at 36. If desired, cyclone separators may be used. If the upper narrowed portion 37 of the larger vessel 24 is enlarged to form a settling chamber, the additional separating means shown at 36 may be eliminated. The upper narrow portion 37 is closed at its upper end by a partition plate 37'.

The vaporous reaction products leave the upper portion of the vessel 24 through line 38 and are introduced into the lower portion of a fractionating tower 40. The reaction products contain a small amount of solid particles and these solid particles are removed in the lower portion of the fractionating tower as will be hereinafter described in greater detail.

In catalytic reactions where the solid particles become contaminated or partially spent after a reaction period it is necessary to regenerate the solid particles. For example, in the catalytic cracking of hydrocarbons, carbonaceous material is deposited on the catalytic and solid particles and the catalytic and solid particles are regenerated by burning off the carbonaceous material. The used solid particles containing catalyst are withdrawn from the annular space 28 by means of standpipes 42 provided with control valves 44. The standpipes 42 communicate with the bottom portion of the draw-off compartment 28 and the solid particles flow from the draw-off compartment 28 into the standpipes 42. A suitable regenerating gas such as air or other oxygen-containing gas is introduced through line 46 into branch lines 48 and 52 for introducing the regenerating gas into the used catalyst and solid particles withdrawn from the annular chamber 28.

As above stated, the fluidized solid particles act like a liquid and produce a pressure at the bottom of the standpipe 42 which is sufficient to carry the solid particles to the regeneration zone 12. By introducing a regenerating gas below the valves 44, a light suspension of solid particles in a gas is formed and the pressure produced by the column of dense solid particles is sufficient to force the used solid particles upwardly in the branch lines 54 and 56 for conveying the solid particles to the regeneration zone 12. In addition to this column in Figure 1, there is a pressure of about 8 pounds per square inch gauge in vessel 24 and reaction zone 10 and this pressure is added to the column to convey the solid particles to regeneration zone 12. The regeneration is under a pressure of only about 1 pound per square inch gauge. The used solid particles are introduced into the regeneration zone below a perforated distribution plate 58.

The velocity of the gas mixed with the solid particles being regenerated is so selected that the solid particles are maintained in a relatively dense fluidized condition and have a level designated at 62. The level 62 is not quiescent but resembles a violently boiling liquid. While the level 62 is shown at one position in Figure 1, it is understood that this level may be varied and may be at higher or lower levels for different reactions or for different oil stocks. Above the level 62 the regeneration zone 12 is provided with an enlarged chamber 64 which forms a settling chamber for separating solid particles from the gases of regeneration. The gases of regeneration pass overhead from the enlarged chamber 64 through line 66 and are further treated to recover residual amounts of solid particles and for preheating the liquid feed when it is a low coke-forming stock as will be presently described. When the liquid feed is of a high coke-forming stock it is preferably cooled after passing through the scrubber presently to be described.

The standpipe 14 used for conveying hot regenerated solid particles from the regeneration zone 12 to the reaction zone 10 has its upper end 68 extending above the distribution plate 58. In this way the solid particles are withdrawn from the body of the fluidized mixture in the regeneration zone 12. The regenerated solid particles in standpipe 14 may be stripped of oxygen-containing gas by introducing a stripping gas such as steam through line 69.

The gases of regeneration passing through line 66 are passed through a suitable cooler 69' provided with vertical tubes 72. A heat exchange medium is circulated through the heat exchanger and around the tubes 72 through inlet line 74 and outlet line 76. The cooled gases of regeneration are then passed through line 78 and introduced into the bottom portion of a scrubber or scrubbing tower 82.

Liquid feed such as liquid oil is passed through line 84 by means of pump 86 and is introduced into the upper portion of the scrubbing tower 82. The liquid feed is sprayed into the upper portion of the scrubbing tower 82 by means of a spray device 88. The falling droplets of liquid feed scrub out any entrained solid particles and at the same time the liquid feed is preheated by absorbing heat from the hot gases of regeneration. The scrubbing tower may be provided with baffles, discs and doughnuts or packing to provide a large surface for contacting the oil with the gases. The cooled and scrubbed gases of regeneration leave the top of the scrubbing tower through a valved line 92 and may be vented to the atmosphere.

The preheated liquid feed when it is of a low coke-forming type and containing the solid particles scrubbed out of the gases of regeneration is withdrawn from the bottom of the scrubbing tower 82 through line 94 and is passed to coil 96 in heat exchanger 97 by a pump 98. In the heat exchanger 97 the oil feed or liquid feed is indirectly contacted with bottoms containing solid particles scrubbed from the vaporous reaction products and withdrawn from the fractionating tower 40 through line 102 by means of pump 104 and passed through line 106 and through the heat exchanger 97. The partly cooled bottoms are withdrawn from the heat exchanger through line 108. The preheated liquid feed leaves the heat exchanger 97 through line 112 and may be combined with at least a portion of the cooled bottoms passing through line 114 and the mixture passed through line 116 and valved by-pass line 118 and 118' around heat exchanger or cooler 119 to the liquid inlet line 18 hereinbefore described.

When the feed is of a high coke-forming type the preheated liquid feed in line 94 is passed through valved line 119' to line 120, by-passing heat exchanger 97. Valve 120' ahead of exchanger 97 is then closed. The high coke-forming stock is preferably passed through line 120 and heat exchanger or cooler 119 to cool the feed oil. In some cases where the preheated feed stock is at the desired temperature, both exchangers 97 and 119 may be by-passed and the feed stock passed through lines 119' and 118' to line 18. The mixture of preheated liquid feed and bottoms passing through line 116 may be passed through valved line 125 and through the coil 126 in the heat exchanger 119 to cool the mixture. A heat exchange medium is introduced into the heat exchanger 119 by means of line 127 and leaves the heat exchanger through line 128. Water may be used in the heat exchanger 119 to produce hot water and/or steam which may be used in other parts of the process. When the oil feed is to be passed through line 125, the valve in the by-pass line 118 is closed.

The vaporous reaction products introduced into the bottom portion of the fractionating tower 40 are at a relatively high temperature and in order to desuperheat them and condense higher boiling contituents and also to remove entrained solid particles, at least a portion of the bottoms is taken off and cooled and returned to the fractionating tower 40. At least a part of the bottoms withdrawn through line 102 is passed through line 132 and heat exchanger 134 wherein the bottoms are indirectly contacted with a heat exchange medium introduced through line 136 and leaving the heat exchanger 134 through line 138. Water may be used as the heat exchange medium and the steam produced may be used in other parts of the process.

The cooled bottoms are withdrawn from the heat exchanger 134 through line 142 and are passed through line 144 having a valve 146 which introduces the cooled bottoms into the bottom portion of the fractionating tower 40. The line 144 at its outlet end in the fractionating tower is provided with spray means 148 for spraying the cooled bottoms above a baffle means 152 whereby intimate contact is provided between the vaporous reaction products and the cooled bottoms and entrained solid particles are scrubbed out to form a slurry. A portion of the cooled bottoms from line 108 may be introduced into line 144 and returned to the bottom of the fractionating tower 40.

The portion of the cooled bottoms passing through line 114 comprises a slurry and contains catalyst and solid particles which were washed out of the vaporous reaction products and the slurry formed is returned to the reaction zone 10 with the oil fed through line 18.

The vaporous reaction products pass upwardly in the fractionating tower where they are fractionated by contact with downflowing condensate oil and the desired product is taken overhead in vapor form through line 154. Where relatively heavy hydrocarbons are cracked to form lower boiling hydrocarbons, the fraction or product taken through line 154 comprises gases and gasoline constituents which may be further treated in any suitable or conventional manner to separate motor fuel. In the treatment of hydrocarbons any desired side streams or fractions may be removed from the side of the fractionating tower.

Referring now to Figure 2 of the drawings, the reference character 172 designates the liquid feed line to the reaction zone 174. In this form of the invention the liquid feed preheating means and the fractionating tower for the reaction products have been omitted from the drawing. However, it is to be understood that the arrangement of coolers and heat exchangers and the scrubbing tower shown in Figure 1 are preferably used with the form of the invention shown in Figure 2.

The reaction zone 174 is similar to the reaction zone 10 described in Figure 1 and comprises a relatively shallow cup-shaped vessel which is supported in a larger vessel 175 by means of suitable supporting means diagrammatically shown at 176.

Solid particles including catalyst particles are directly introduced from hopper 182 into the reaction zone 174 by means of standpipe 184 having a control valve 186. The solid particles are maintained in fluidized condition in the reaction zone 174 and overflow into the annular space 188 as described in connection with Figure 1 of the drawings. Stripping gas such as steam is preferably introduced into the denser fluidized mixture in the the annular chamber 188 through line 192.

The spent catalyst or solid particles flow into the standpipe 194 provided below the larger outer vessel 175. The standpipe 194 is provided with a control valve 196 near its lower end.

The fluidized mixture in the reaction zone 174 has a level 197 and the fluidized mixture in the overflow chamber 188 has a level 198. The height of fluidized mixture from the level 198 to the valve 196 produces a pressure similar to hydrostatic pressure which is sufficient to force the spent catalyst to the regeneration zone presently to be described.

Regenerating gas such as air or oxygen-containing gas is introduced into the spent catalyst and solid particles below the valve 196 by means of line 199 to form a relatively light suspension of solid particles in gas. The light suspension is passed through line 202 and into the bottom of a regeneration zone 204. The velocity of the regenerating gas is so selected that a level 205 of fluidized catalyst or solid particles undergoing regeneration is formed in the regeneration zone 204. While the level 205 is shown in one position in Figure 2, it is to be understood that it may be varied and may be higher or lower with different oil stocks or different reactions. In this form of the invention it will be seen that the regeneration zone 204 is supported near ground level and in order to move the particles to a position above the reaction zone 174 an upflow regeneration zone is used. That is, all of the regeneration gases and the solid particles pass overhead from the regeneration zone 204 through line 206 and are passed into a separating zone 208 above the hopper 182 which feeds the hot regenerated catalyst to the standpipe 184 previously described.

The enlarged space 208 provides a settling chamber for separating regenerated solid particles from gases of regeneration. If desired, additional cyclone or like separating means such as diagrammatically shown at 212 may be used. The separated solid particles are collected in the hopper 182 with a level shown at 214. The gases of regeneration pass overhead through line 216 and in the preferred form of the invention a cooler and scrubber are used as shown in Figure 1 for removing entrained solid particles from the regeneration gases and also to recover heat from the regeneration gases where a low coke-forming feed stock is used.

If desired, a suitable stripping gas such as steam may be introduced into the regenerated catalyst or solid particles in hopper 182 through line 218.

In the reaction zone 174 the velocity of the vapors passing therethrough is selected so that a fluidized mass of solid particles is obtained. The vaporous reaction products leaving the reaction zone 174 enter the enlarged space or chamber 219 wherein further separation of solid particles from vapors takes place. The upper portion of the vessel 175 is shown as restricted on the drawing and is provided with additional separating means 220 thereon for separating additional quantities of solid particles from the reaction products. Instead of having the separating means 220 the upper portion of the outer vessel 175 may be enlarged to form a separating chamber or settling chamber and in this case the further separating means 220 such as cyclone separators may be eliminated.

The vaporous reaction products leave the top of the vessel 175 through line 221 and are preferably passed to the bottom portion of a fractionating tower similar to that shown in Figure 1 of the drawings.

In the form of the invention shown in Figure 3 of the drawings the regenerator is shown in an elevated position and is of the bottom draw-off type whereas the reactor is of the upflow type and is arranged near the ground level. In this form of the invention the liquid feed is introduced through line 230 and is mixed with hot regenerated solid particles introduced into the mixing chamber 231 from standpipe 232 having a control valve 234. The mixture is passed through line 236 and upwardly through a high velocity upflow reactor 238 wherein the solid particles and oil vapors are mixed and the oil is converted to lower boiling hydrocarbons. In this type of reactor the vaporous reaction products and the solid particles pass overhead from the top of the reaction zone 238. The upper portion of the reaction zone 238 is provided with a spiral separator 242 to give the suspension a spiral motion and to assist in separating solid particles from vaporous reaction products.

Arranged above the top of the reaction zone 238 is an enlarged chamber 244 into which the top of the reaction zone discharges. Due to the enlarged area for gas flow, the velocity of the vapors and gases is decreased and there is a separation of solid particles from vapors and gases. The solid particles are collected in an annular chamber 246 surrounding the upper portion of the reaction zone 238 and forming part of the enlarged chamber 244 surrounding the upper portion of the reaction zone 238. The level of the separated solid particles in the annular chamber 246 is shown at 248.

The separated reaction products in vapor form pass upwardly into the restricted portion 251 of the outer vessel 244 and preferably pass through additional separating means 252 such as diagrammatically shown cyclone separators for separating additional quantities of solid particles from the vapors. Instead of restricting the upper portion of the vessel 244, the chamber may be enlarged to form an additional settling chamber and in this event the separating means such as cyclones shown diagrammatically at 252 may be omitted.

The separated vaporous reaction products leave the top of the enlarged chamber 244 through line 254 and are preferably passed to a fractionating tower similar to that shown in Figure 1 of the drawings.

The spent or fouled solid particles in the annular space 246 are preferably stripped to remove volatile hydrocarbons and the like by introducing a suitable stripping gas such as steam through line 256. These solid particles are also maintained in a fluidized condition and flow into a standpipe 258 provided with a control valve 262 and then to a mixing chamber 263. Regenerating gas is introduced into the mixing chamber 263 by means of line 264 and the mixture of solid particles and gas is passed through line 266 and upwardly through line 268 into the bottom portion of a regeneration zone 272. The fluidized fouled solid particles are maintained in a relatively dense condition and the pressure formed by the head of fluidized solid particles extending from the level 248 to the valve 262 is sufficient to return the relatively light suspension passing through lines 266 and 268 to the regeneration zone 272.

In Figure 3 the chamber 244 is under about 8 pounds per square inch pressure whereas the regeneration zone 272 is under about 1 pound per square inch pressure. With these pressures and with the columns of fluidized solid particles including standpipes 232 and 258, the flow of the streams of fluidized solid particles is as above described.

The solid particles to be regenerated are introduced into the regeneration zone 272 below the perforated distribution plate 274. In the regeneration zone 272 the particles are maintained in a fluidized condition during regeneration and the mass has a level as shown at 276. As above pointed out in connection with Figures 1 and 2, level 276 may similarly be varied. The velocity of the regenerating gas is so selected or maintained that there is some settling of the particles and a fluidized mixture is formed. The regeneration gases leaving the fluidized mixture pass upwardly into settling space 276' and then into the restricted portion 277 of the regeneration vessel and may be passed through separating means 278 diagrammatically shown for removing additional amounts of solid particles from regeneration gases. The regeneration gases leave the top of the vessel 272 through line 282 and may be passed through a cooler and scrubber as shown in Figure 1 of the drawings. Instead of having the upper portion of the vessel 272 restricted at 277 the vessel may have an enlarged dome to provide additional settling space and in this case the additional separating means 278 may be eliminated.

The regenerated solid particles are withdrawn in fluidized condition from a withdrawal compartment 284 shown as extending above the distribution plate 274 and communicating with the standpipe 232. Preferably, a stripping gas such as steam is introduced into the withdrawal chamber 284 through line 286 to remove residual oxygen-containing gas from the hot regenerated solid particles.

To accelerate vaporizing, the oil stream is preferably subdivided into a plurality of smaller streams when it is mixed with the hot solid particles from the standpipes 14 (Figure 1), 184 (Figure 2) and 232 (Figure 3).

Instead of or in addition to steam or the like used to strip the hot regenerated solid particles in standpipe 14 in Figure 1, hopper 182 in Figure 2 and withdrawal chamber 284 in Figure 3, a combustible gas such as a hydrocarbon gas may be introduced through lines 69, 218 and 286 respectively, to reduced the oxygen concentration in the regenerated solid particles.

As above described, the invention as shown in the different forms in the drawings contemplates using liquid oil at relatively low temperatures and without preheating the oil in a fired coil or other heater and mixing this oil with hot regenerated solid particles to supply the heat necessary to vaporize and crack the oil. In order to have a sufficient quantity of solid particles to provide the necessary heat it is often necessary to substitute inert solid material for a portion of the catalyst particles. If only catalyst were used, the catalyst to oil ratio would be high, the time of reaction would be extremely short and it would be impossible to control the reaction in most cases. The mixture of solid particles and catalyst particles during regeneration is heated to a temperature higher than the cracking temperature and these solid particles are directly mixed with the liquid oil to raise the oil to a cracking temperature.

When of a low coke-forming stock, the oil feed may be preheated by indirect heat exchange at a plurality of places in the process but a separate fired coil or heating furnace for vaporizing the oil is not required. The catalyst for cracking hydrocarbons may be any suitable one such as acid treated bentonite clay, synthetic gels containing silica and alumina or silica and magnesia. The inert solid material may be pumice, sand, kieselguhr, or any other similar material. The catalyst particles and the solid heat carrier material are preferably of such size, shape and density that there is substantially no separation or segregation of the catalyst particles and heat carrier particles during the operation of the process. Preferably, the catalyst and heat carrier particles are of a size between about 200 and 400 standard mesh or finer. In the catalytic cracking of oils, reduced crudes or gas oils may be used as the liquid feeds which are vaporized and raised to cracking temperature by the hot regenerated solid particles.

In some cases it may be desirable, however, to select the catalyst particles smaller or lighter than the inert particles. In the bottom draw-off type of reactor the regenerator described in this application there would be a tendency for the smaller and lighter particles to remain longer in the vessels than the heavy, large particles which would be able to fall into the catalyst withdrawal spaces more readily. Thus, in catalytic cracking properly selected inert material would normally contain no carbonaceous material after passing through the cracking zone. Consequently, it is not necessary that it remain in the regeneration zone any longer than necessary for the absorption of its proportionate share of the heat of regeneration. This time is much shorter than would be necessary if carbonaceous material had to be removed therefrom. Consequently, if the catalyst particles are either lighter or smaller than the inert particles it is sometimes possible to decrease the total pounds of solid held in the regenerator with a resultant saving in the regenerator cost.

Conversely, if the inert particles are so selected that they are smaller or lighter than the catalyst particles, the catalyst residence time may be decreased and in some reactions this is desirable.

Where insufficient heat is produced during regeneration in the regeneration zones or vessels shown in the drawings, further heat may be supplied to the solid particles by firing the regeneration zones. Or, if the amount of heat produced during regeneration varies due to different amounts of carbonaceous deposits on the solid particles from different oil stocks, the heat produced in the regeneration zone may be maintained substantially constant by firing the regeneration zone. For this firing suitable combustion material such as fuel oil or the like is introduced into the bottom portion of the regeneration zone 12, for example in Figure 1, through line 300 below distribution plate 58 for admixture with the fouled solid particles introduced into the regeneration zone 12 through lines 54 and 56. In Figure 2 the combustible material is preferably introduced into the regeneration zone 204 through line 302 and in Figure 3 through line 304 below distribution plate 274.

In Figures 2 and 3 the levels 197, 205, 248 and 276 are similar to levels 22 and 62 described in connection with Figure 1.

In the form of the invention shown in Figure 1 of the drawings where it is desired to have about 45% conversion to gasoline of a reduced crude oil the cracking temperature is about 980° F. and the regeneration temperature is about 1150° F. In order to supply the heat of vaporization and cracking, the ratio of solid material to gas oil by weight is about 18 to 1. The catalyst is included in this solid to oil ratio and the amount of catalyst is about in the proportion of about 5 parts of catalyst to 1 part of oil by weight. The velocity of the vapors and gases in the reaction zone and regeneration zone is about 1.5 feet per second. Under these conditions about 5.4% carbon by weight is deposited on the solid particles and after regeneration about 1% carbonaceous material by weight remains on the regenerated solid particles. Depending on the coke-forming characteristics of the stock, the oil feed may be preheated to temperatures from about 160° F. to 650° F. the higher temperatures giving lower carbonaceous deposits than the lower temperatures. With higher regeneration temperatures the amount of solid to oil used will be reduced.

In the reaction zone 10 the fluidized mixture has a density of about 19.5 pounds per cubic foot and the density of the suspension passing upwardly in lines 54 and 56 is about 2 pounds per cubic foot. The regenerator is maintained under a pressure of about 1 pound per square inch gauge and the reaction zone is maintained under a pressure of about 8 pounds per square inch gauge. The reason for maintaining the reaction zone under a slight pressure is to provide sufficient pressure to overcome pressure drop through the lines and through the fractionating tower 40.

In the form of the invention shown in Figure 2 the regeneration zone 204 is supported near ground level. Substantially the same conditions and results are obtained in this form of the invention as disclosed in connection with Figure 1 except that the velocity of the regenerating gas is about 3 feet per second.

In Figure 3 of the drawings the conditions of operation are about the same as those given for Figure 1 with the exception that in the reaction zone 238 the velocity of the vapors and gases is about 20 feet per second and the density of the mixture in the reaction zone 238 is about 7.7 pounds per cubic foot.

If desired or if necessary, suitable fluidizing gas may be introduced into the standpipes in Figures 1, 2 and 3 to maintain the solid particles in fluidized condition.

While the invention has been particularly described in connection with catalytic conversion or cracking of hydrocarbon oils, it is to be understood that it may also be used in other catalytic reactions such as oxidation, reduction, reforming of hydrocarbons, hydroforming of hydrocarbons, etc. My invention may also be used for carrying out conversions of hydrocarbons or other catalytic reactions generally where the reactants are available in vapor or gas form and in these cases the regenerated hot solid particles are mixed with such vapors or gases to raise them to reaction temperature without using a vaporizing furnace.

While several forms of the invention have been shown and specific conditions and proportions given with respect to the particular forms shown, it is to be understood that these are by way of illustration only and various changes and modifications may be made without departing from the spirit of the invention.

This application is being filed as a division of my application Serial No. 424,872, filed December 30, 1941, and now Patent Number 2,399,050, granted April 23, 1946.

I claim:

1. An apparatus of the character described including a regeneration vessel and a reaction vessel arranged at about the same level, a shallow cup-shaped member arranged in the lower portion of the reaction vessel and maintained in spaced relation to the inner walls of the reaction vessel forming an annular passageaway between the outerwalls of said cup-shaped member and the inner walls of said reaction vessel into which the solid particles overflow from said cup-shaped member, outlet means in the upper part of said reaction vessel for the withdrawal of gaseous reaction products, a standpipe extending from within said shallow cup-shaped member upwardly through the top of the reaction vessel for introducing hot regenerated solid particles in dense fluidized condition into said cup-shaped member, conduit means for introducing liquid feed into the lower portion of said cup-shaped member, an outlet in the bottom of said reaction vessel for the withdrawal of solid particles from the lower portion of said annular passageway, a conduit for conducting withdrawn solid particles from said outlet into the lower portion of said regeneration vessel, means for introducing regenerating gas into said conduit in order to convey the withdrawn solid particles into said regeneration vessel, a conduit arranged in the top of said regeneration vessel for removing the bulk of the hot regenerated solid particles and the regeneration gases overhead from said regeneration vessel, means for separating hot regenerated solid particles from regeneration gases connected to the discharge end of said last-named conduit, said last-mentioned means being arranged at a higher level than said reaction vessel and being connected to the upper end of said standpipe whereby hot regenerated solid particles may be conveyed by gravity directly into said cup-shaped member.

2. An apparatus of the character described including a regeneration vessel and a reaction vessel, a shallow cup-shaped member arranged in the lower portion of said reaction vessel and maintained in spaced relation to the inner walls of said reaction vessel, forming an annular passageway between the outer walls of said cup-shaped member and the inner walls of said reaction vessel into which the solid particles leaving the cup-shaped member are discharged, an outlet in the top of said reaction vessel for the withdrawal of gaseous reaction products, a standpipe extending from within said cup-shaped member upwardly through the top of the reaction vessel for introducing hot regenerated solid particles in dense fluidized condition into said cup-shaped member, conduit means for introducing liquid feed directly into the lower portion of said cup-shaped member for admixture with the solid particles and for forming a dense fluidized mixture therewith, an inlet for the supply of stripping gas into said annular passageway, an outlet in the bottom of said reaction vessel for the discharge of spent solid particles, a conduit for conducting the spent solid particles from the bottom of the reaction vessel into the bottom portion of the regeneration vessel, means for introducing regenerating gas into said conduit for conveying the solid particles into said regeneration vessel, a conduit connected to the top of said regeneration vessel for removing the bulk of the hot regenerated particles and the regeneration gases overhead from said regeneration vessel, means for separating and cooling hot regenerated solid particles from the regeneration gases connected to the discharge end of said last-named conduit, said separating and cooling means being arranged at a higher level than said reaction vessel and being provided with fluidizing means for the cooled solids, said separating and cooling means being connected to the upper end of said standpipe whereby hot regenerated solid particles may be conveyed by gravity directly into said cup-shaped member.

3. A process for carrying out catalytic reactions which comprises introducing hot regenerated solid particles containing catalyst through a vertical standpipe directly into a dense fluidized mixture of solid particles and reactant in a reaction zone, introducing the stream of reactants in the liquid state into said reaction zone separately from said solid particles, controlling the amount of hot regenerated solid particles containing catalyst in the reaction zone to vaporize the feed and supply heat of reaction, maintaining the solid particles and reactant in a dense fluidized condition in said reaction zone for a sufficent time to effect the desired extent of reaction, removing the reaction products containing only a minor amount of solid particles overhead from the vessel containing said reaction zone, discharging spent solid particles from said reaction zone into the bottom portion of said vessel, withdrawing spent solid particles from the bottom of said vessel in a dense fluidized condition separately from said reaction products, mixing regenerating gas with the removed particles and passing the resulting mixture into the bottom portion of a regeneration zone, controlling the velocity of the regenerating gas so as to remove the bulk of the hot regenerated solid particles overhead from said regeneration zone, separating hot regenerated particles from regeneration gases and recycling the hot solid particles by gravity into said reaction zone for admixture with additional liquid reactant feed.

4. A process for carrying catalytic cracking of hydrocarbons which comprises introducing hot regenerated catalyst particles through a vertical standpipe directly into a dense fluidized mixture of solid catalyst particles and hydrocarbon reactants in a conversion zone, introducing a stream of liquid hydrocarbons into said conversion zone separately from said catalyst particles, controlling the amount of hot regenerated cracking catalyst in the conversion zone to vaporize the hydrocarbons and supply the heat of cracking, maintaining the catalyst particles and hydrocarbon vapors in a dense fluidized condition in said conversion zone for a sufficient time to effect the desired cracking, removing the vaporous reaction products containing only a minor amount of solid particles overhead from the vessel containing the conversion zone, discharging spent catalyst particles from said conversion zone into the bottom of the vessel, withdrawing spent catalyst particles from the bottom of said vessel in a dense fluidized condition separately from said vaporous reaction products, stripping the removed spent catalyst particles, mixing regenerating gas with the removed stripped catalyst particles and passing the resulting mixture into the bottom portion of a regeneration vessel, controlling velocity of the regenerating gas so as to remove the bulk of the hot regenerated catalyst particles and regeneration gases overhead from said regeneration vessel, separating hot regenerated catalyst particles from the regeneration gases in a zone above said conversion zone and separate therefrom and passing the separated hot regenerated catalyst particles from said separating zone to said conversion zone for admixture with additional liquid hydrocarbons.

5. A process for carrying out catalytic reactions which comprises introducing hot regenerated solid catalyst particles through a vertical standpipe directly into a dense fluidized mixture of catalyst or catalyst particles and reactants in a reaction zone, introducing a stream of reactants in the liquid state into said reaction zone separately from said solid catalyst particles, controlling the amount of hot regenerated solid catalyst particles in the reaction zone to vaporize the reactant feed and supply the heat of reaction, maintaining the solid catalyst particles and reactant in a dense fluidized condition in said reaction zone for a sufficient time to effect the desired extent of reaction, removing the vaporous reaction products containing only a minor amount of solid catalyst particles overhead from the vessel containing the reaction zone, discharging the spent solid catalyst particles from said reaction zone into the bottom of said vessel, withdrawing spent solid catalyst particles from the bottom of said vessel in a dense fluidized condition separately from said reaction products, mixing regenerating gas with the withdrawn spent catalyst particles passing the mixture to a regeneration zone arranged at about the same level as said reaction zone, controlling the velocity of the regenerating gas so as to remove the bulk of the hot regenerated catalyst particles and regeneration gases overhead from said regeneration zone, separating hot regenerated solid catalyst particles from regeneration gases in a zone above said reaction zone and recycling the solid catalyst particles thus separated to said reaction zone as a downwardly moving column for admixture with additional liquid reactant feed.

HOMER Z. MARTIN.

REFERENCES CITED

The following references are of record in the file of this patent:

UNITED STATES PATENTS

| Number | Name | Date |
|---|---|---|
| 2,253,486 | Belchetz | Aug. 19, 1941 |
| 2,337,684 | Scheineman | Dec. 28, 1943 |
| 2,340,878 | Holt et al. | Feb. 8, 1944 |
| 2,341,193 | Scheineman | Feb. 8, 1944 |
| 2,376,190 | Roetheli et al. | May 15, 1945 |
| 2,399,050 | Martin | Apr. 23, 1946 |